Patented Oct. 16, 1951

2,571,330

UNITED STATES PATENT OFFICE 2,571,330

$\Delta^{5,7}$-ANDROSTADIENOLONES AND PROCESS

Seymour Bernstein and Karl J. Sax, Pearl River, N. Y., assignors to American Cyanamid Company, New York, N. Y., a corporation of Maine No Drawing. Application October 27, 1949, Serial No. 123,974

10 Claims. (Cl. 260—397.4)

The present invention relates to $\Delta^{5,7}$-androstadiene-3-$\beta$-ol-17-one, its esters and methods of preparing the same.

It is known that sterols, such as cholesterol, can be brominated in the 7-position to obtain the corresponding 7-bromo derivative which can then be treated with a tertiary amine and the hydrobromic acid split out to produce an unsaturated bond in the 7-position of the sterol nucleus. The sterols are generally defined as a specific group in the general field of steroids which have an aliphatic group in the 17-position.

We have now found that a compound such as dehydroisoandrosterone can be selectively brominated to produce the corresponding 7-bromo derivative which can be treated with a tertiary amine to produce the corresponding $\Delta^{5,7}$-androstadiene-3-$\beta$-ol-17-one. It might be expected that bromination would also take place in the alpha-position to the 17 ketone i. e. at the $C_{16}$ position. However, we have found that this does not occur and that bromination takes place only in the 7-position.

The compounds of the present invention are white crystalline solids, sensitive to light and capable of absorbing oxygen from the air on standing. They are, in general, soluble in chloroform or benzene and insoluble in water.

The reaction to prepare the compounds of the present invention may be carried out by dissolving an ester of dehydroisoandrosterone in an organic solvent. We prefer to use a mixture of a saturated hydrocarbon solvent and a chlorinated hydrocarbon solvent. A brominating agent such as N-bromosuccinimide, N-bromophthalimide, etc., is then added. Best results have been obtained by heating and irradiating the reaction mixture with one or more electrical light sources. These may take the form of photoflood or photospot bulbs. The 7-brominated dehydroisoandrosterone ester may be isolated and purified before splitting out the bromine as hydrobromic acid. However, we prefer to add a tertiary amine to the reaction mixture at the end of the bromination step while the mixture is still hot because of the fact that increased yields are usually obtained under these conditions. The reason for this is not known to applicants, however, it may be that the presence of the tertiary amine causes the dehydrohalogenating reaction to begin to take place at once, thus preventing the formation of undesirable dehydroisoandrosterone derivatives by side reactions.

In carrying out the bromination step to obtain the 7-bromo derivative of a dehydroisoandrosterone ester the most desirable esters are the benzoate and the acetate; however, other esters can be used such as the propionate, butyrate, chlorobenzoate and the like. In carrying out the reaction it is preferred to use a saturated hydrocarbon such as petroleum ether, cyclohexane and the like with a completely halogenated hydrocarbon such as carbon tetrachloride. Unsaturated hydrocarbons show a tendency to lower the yield of final product. The initial reaction to produce the bromo derivative of a dehydroisoandrosterone ester is usually completed within a period of one minute to about one hour. At about the time the bromination is complete, while the mixture is still hot, a small amount of tertiary amine such as quinoline, dialkylanilines, pyridine, 2,4,6-collidine or other substituted pyridines, is added to the reaction mixture.

After the bromination reaction is complete the mixture is cooled, the succinimide, phthalimide, etc., removed and the solvent then removed from the reaction mixture by distillation under reduced pressure. The residue is dissolved in a second solvent such as toluene, xylene, n-octane and the like, along with an additional small amount of tertiary amine. The preferred solvents are those having a boiling point range between 100° C. and 150° C. The reaction is completed within a period of from five minutes to about one and one-half hours at the above temperature range. The reaction mixture is then cooled and the amine hydrobromide removed by filtration. Evaporation under reduced pressure gives the desired product. The reaction product may also be obtained by working up the product in an extraction procedure with a hydrocarbon solvent.

The process is carried out using various esters hereinbefore mentioned. Should $\Delta^{5,7}$-androstadiene-3-$\beta$-ol-17-one itself be desired, it can be obtained by saponifying the ester with a solution of an alkali metal hydroxide.

The compounds of the present invention are useful as pharmaceuticals, particularly in the hormone field.

The invention will be described in greater detail in the following examples which illustrate the preferred method of preparing $\Delta^{5,7}$-androstadiene-3-$\beta$-ol-17-one esters from the corresponding dehydroisoandrosterone ester.

*Example 1*

A mixture of 3.3 g. (0.01 M) of dehydroisoandrosteryl acetate, 2.15 g. (0.012 M) of N-bromosuccinimide, 75 ml. of petroleum ether (boiling point 64°–66° C., freed of unsaturates), and 50 ml. of reagent carbon tetrachloride was refluxed and irradiated for five minutes by the heat and light of one photospot lamp (type RSP-2, General Electric Co.). To the still refluxing mixture was added 7.5 ml. of s-collidine; the mixture was cooled and filtered. The filtrate was evaporated under reduced pressure and the residue was treated with 125 ml. of xylene, and was refluxed in a nitrogen atmosphere for fifteen minutes. The mixture was cooled, and filtered through diatomaceous earth. The filtrate was evaporated under reduced pressure (nitrogen atmosphere). The oily residue which contained a small amount of xylene was treated with methanol, and the solvents were removed under reduced pressure (nitrogen atmosphere). This gave a mixture of oil and solid. The residue was dissolved in methanol, and concentrated with simultaneous addition of water. The resulting crystals were separated by filtration and weighed 1.93 g. The material was 70% pure $\Delta^{5,7}$-androstadiene-3-$\beta$-ol-17-one acetate, and represented a spectroscopic yield of 41%. The material was further recrystallized from dilute methanol and then petroleum ether (boiling point 64°–66° C.). The product had a melting point of 155.5°–158° C.

*Example 2*

A solution of 500 mg. of $\Delta^{5,7}$-androstadiene-3-$\beta$-ol-17-one acetate and 30 ml. of 5% alcoholic potash was allowed to stand at room temperature overnight. Addition of water gave a precipitate, and the mixture was allowed to stand at room temperature for 1.5 hours. The solid was collected by filtration, and was washed with water and dilute methanol, weight 0.45 g. Recrystallization from dilute methanol and benzene-petroleum ether (boiling point 64°–66° C.) to constant melting point and ultraviolet absorption spectrum gave 0.21 g. of $\Delta^{5,7}$-androstadiene-3-$\beta$-ol-17-one, melting point 187°–189° C.

*Example 3*

A mixture of 3.92 g. (0.01 M) of dehydroisoandrosteryl benzoate, 2.15 g. (0.012 M) of N-bromosuccinimide, 25 ml. of petroleum ether (boiling point 64°–66° C., freed of unsaturates) and 50 ml. of carbon tetrachloride was refluxed and irradiated for three minutes by the heat and light of one photospot lamp (type RSP-2, General Electric Co.). The hot reaction mixture was filtered and 5 ml. of s-collidine was added. The petroleum ether and carbon tetrachloride were removed by distillation under reduced pressure (nitrogen atmosphere). The residue was treated with 50 ml. of xylene. The mixture was refluxed for twelve minutes in a nitrogen atmosphere, cooled, and filtered. The filtrate was evaporated under reduced pressure (nitrogen atmosphere) and the residue was treated with acetone. Four fractions of crystals were obtained; (1) weight 1.55 g., melting point 150°–230° C., d; (2) weight 0.92 g., melting point 164°–172° C.; (3) weight 0.24 g., melting point 164°–166° C.; and (4) 0.30 g., melting point 160°–161° C. Fractional recrystallization of fraction (1) from acetone gave 0.40 g. of $\Delta^{5,7}$-androstadiene-3-$\beta$-ol-17-one benzoate, melting point 253°–256° C.

*Example 4*

To a solution of 0.1 g. of sodium hydroxide in 10 ml. of methanol was added 0.4 g. of $\Delta^{5,7}$-androstadiene-3-$\beta$-ol-17-one benzoate; the mixture was refluxed for one hour, and the product was worked up in benzene as described in Example 1. The benzene solution was concentrated with simultaneous addition of petroleum ether (boiling point 66°–68° C.). This gave 0.32 g. of $\Delta^{5,7}$-androstadiene 3-$\beta$-ol-17-one. Two recrystallizations from benzene-petroleum ether (boiling point 66°–68° C.) gave 0.22 g., melting point 186°–189° C.

*Example 5*

Three and three-tenths grams (0.01 M) of dehydroisoandrosteryl acetate was dissolved in 50 ml. of carbon tetrachloride. This solution was treated with 2.15 g. (0.012 M) of N-bromosuccinimide and 75 ml. of petroleum ether (boiling point 64°–66° C. freed of unsaturates) and the mixture was refluxed and irradiated for five minutes by the heat and light of one photospot lamp (type RSP-2, General Electric Co.). The reaction mixture was immediately cooled and filtered. The succinimide so removed was washed with a small amount of carbon tetrachloride. The washing was combined with the filtrate which was evaporated under reduced pressure at room temperature and below (during the evaporation, crystals appeared). The solid residue was treated with petroleum ether (boiling point 64°–66° C.) and was collected by filtration, weight 2.54 g., melting point 112° d. (put in bath at 109°). By a triangular recrystallization from benzene-petroleum ether (boiling point 64°–66° C.) of this product and material obtained from the mother liquor there was obtained (1) 1.33 g., melting point 154.4°–155° d. (put in bath at 151°); (2) 0.85 g., melting point 155° C. (put in bath at 151°), and 0.31 g., melting point 153° d. (put in bath at 150°). Total weight 2.49 g., 61% yield of 7-$\beta$-bromodehydroisoandrosteryl acetate. Further recrystallization of the first fraction from benzene-petroleum ether (boiling point 64°–66° C.) did not alter the melting point (155° C. d.) (put in bath at 150° C.).

The above product was reacted with s-collidine in the presence of xylene, as in Example 1, followed by saponification to produce $\Delta^{5,7}$-androstadiene-3-$\beta$-ol-17-one.

We claim:

1. A compound of the group consisting of those having the formula:

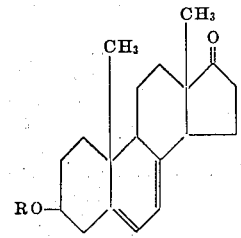

in which R is a member of the group consisting of hydrogen, lower alkyl carbonyl and benzoyl radicals.

2. $\Delta^{5,7}$-Androstadiene-3-$\beta$-ol-17-one.
3. $\Delta^{5,7}$-Androstadiene-3-$\beta$-ol-17-one acetate.
4. $\Delta^{5,7}$-Androstadiene-3-$\beta$-ol-17-one benzoate.
5. A process for preparing $\Delta^{5,7}$-androstadiene-3-$\beta$-ol-17-one benzoate which comprises heating and irradiating dehydroisoandrosteryl benzoate and N-bromosuccinimide in a mixture of a saturated hydrocarbon solvent and a chlorinated hydrocarbon solvent, adding to the hot mixture a tertiary amine, cooling said mixture, filtering, removing said solvent mixture under reduced pressure, heating the brominated dehydroisoandrosteryl benzoate in a stable hydrocarbon solvent having a boiling point range between 100° and 150° C. in the presence of a tertiary amine for from 5 minutes to 1½ hours, removing said tertiary amine in the form of its hydrobromide salt and recovering the Δ⁵,⁷-androstadiene-3-β-ol-17-one benzoate therefrom.

6. A process for preparing Δ⁵,⁷-androstadiene-3-β-ol-17-one acetate which comprises heating and irradiating dehydroisoandrosteryl acetate and N-bromosuccinimide in a mixture of a saturated hydrocarbon solvent and a chlorinated hydrocarbon solvent, adding to the hot mixture a tertiary amine, cooling said mixture, filtering, removing said solvent mixture under reduced pressure, heating the brominated dehydroisoandrosteryl acetate in a stable hydrocarbon solvent having a boiling point range between 100° and 150° C. in the presence of a tertiary amine, for from 5 minutes to 1½ hours, removing said tertiary amine in the form of its hydrobromide salt and recovering the Δ⁵,⁷-androstadiene-3-β-ol-17-one acetate therefrom.

7. A process for preparing Δ⁵,⁷-androstadiene-3-β-ol-17-one which comprises heating and irradiating a dehydroisoandrosterone ester and N-bromosuccinimide in a mixture of a saturated hydrocarbon solvent and a chlorinated hydrocarbon solent, adding to the hot mixture a tertiary amine, cooling said mixture, filtering, removing said solvent mixture under reduced pressure, heating the brominated dehydroisandrosterone ester in a stable hydrocarbon solvent having a boiling point range of between 100° C. and 150° C. in the presence of a tertiary amine for from 5 minutes to 1½ hours, removing said tertiary amine in the form of its hydrobromide salt, saparating the Δ⁵,⁷-androstadiene-3-β-ol-17-one ester, heating said ester in an aqueous solution of an alkali metal hydroxide and recovering the Δ⁵,⁷-androstadiene-3-β-ol-17-one therefrom.

8. A process of preparing a compound having the formula:

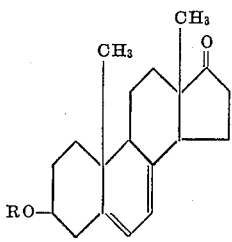

in which R is a member of the group consisting of hydrogen and carboxylic acid acyl radicals which comprises heating and irradiating a 3-carboxylic acid acyloxy dehydroisoandrosterone and N-bromosuccinimide in an organic solvent, adding to the hot mixture a tertiary amine, cooling said mixture, filtering, removing said solvent, heating the brominated said dehydroisoandrosterone in a stable hydrocarbon solvent in the presence of a tertiary amine, removing said tertiary amine in the form of its hydrobromide salt and recovering said product therefrom.

9. A process of preparing a compound having the formula:

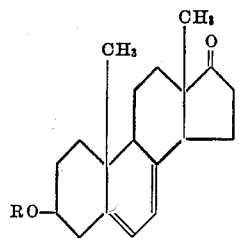

in which R is a carboxylic acid acyl radical which comprises heating and irradiating a 3-carboxylic acid acyloxy dehydroisoandrosterone and N-bromosuccinimide in a mixture of a hydrocarbon solvent and a chlorinated hydrocarbon solvent, adding to the hot mixture a tertiary amine, cooling said mixture, filtering, removing said solvent mixture under reduced pressure, heating the brominated said dehydroisoandrosterone in a stable hydrocarbon solvent in the presence of a tertiary amine, for from 5 minutes to 1½ hours, removing said tertiary amine in the form of its hydrobromide salt and recovering the 3-carboxylic acid acyloxy Δ⁵,⁷-androstadiene-17-one therefrom.

10. A process of preparing a compound having the formula:

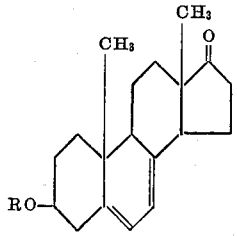

in which R is a carboxylic acid acyl radical which comprises heating and irradiating a 3-carboxylic acid acyloxy dehydroisoandrosterone and N-bromosuccinimide in a mixture of petroleum ether and carbon tetrachloride, adding to the hot mixture a tertiary amine, cooling said mixture, filtering, removing said solvent mixture under reduced pressure, dissolving the brominated said dehydroisoandrosterone in a stable hydrocarbon solvent having a boiling point range between 100° and 150° C. in the presence of a tertiary amine, heating the mixture to within the range of 100° to 150° C. for from 5 minutes to 1½ hours, removing said tertiary amine in the form of its hydrobromide salt and recovering the 3-carboxylic acid acyloxy Δ⁵,⁷-androstadiene-17-one therefrom.

SEYMOUR BERNSTEIN.
KARL J. SAX.

REFERENCES CITED

The following references are of record in the file of this patent:

Djerassi, Chemical Reviews 43, 283, 312 (1948).